US008509817B2

(12) United States Patent
Kaarela et al.

(10) Patent No.: US 8,509,817 B2
(45) Date of Patent: Aug. 13, 2013

(54) SYSTEM AND METHOD FOR MOBILE TELEPHONE AND UPNP CONTROL POINT INTEGRATION

(75) Inventors: Kari Kaarela, Oulu (FI); Mikko A. Hyvarinen, Oulu (FI); Jukka Parkkinen, Oulu (FI); Hannu Kauniskangas, Oulu (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 1232 days.

(21) Appl. No.: 11/386,508

(22) Filed: Mar. 22, 2006

(65) Prior Publication Data
US 2007/0226311 A1    Sep. 27, 2007

(51) Int. Cl.
*H04W 24/00* (2009.01)
(52) U.S. Cl.
USPC ...................................... 455/456.4; 455/41.2
(58) Field of Classification Search
USPC .............. 455/456.1, 456.4, 70, 88, 418, 419, 455/420, 701, 68, 41.1, 41.2, 41.3
See application file for complete search history.

(56) References Cited

U.S. PATENT DOCUMENTS

| 5,987,106 | A  | * | 11/1999 | Kitamura | 379/110.01 |
|---|---|---|---|---|---|
| 7,069,027 | B2 | * | 6/2006  | Miriyala  | 455/456.4 |
| 7,865,198 | B2 | * | 1/2011  | Shin      | 455/466 |
| 2004/0123321 | A1 | * | 6/2004  | Striemer | 725/62 |
| 2004/0198335 | A1 | * | 10/2004 | Campen   | 455/419 |
| 2004/0203353 | A1 | * | 10/2004 | Connor   | 455/41.1 |
| 2006/0041596 | A1 | * | 2/2006  | Stirbu et al. | 707/200 |

FOREIGN PATENT DOCUMENTS

| CN | 1714557 | 12/2005 |
|---|---|---|
| EP | 1686747 | 8/2006 |
| WO | WO 02/37740 | 5/2002 |
| WO | WO 2006/018717 | 2/2006 |
| WO | WO 2006/061682 | 6/2006 |

OTHER PUBLICATIONS

Buerk, Larry; Moonen, Jean; Sather, Dale; Fu, John Kai. "AVTransport:1 Service Template Version 1.01: for UPnP Version 1.0," Jun. 25, 2002. 1999-2002 Contributing Members of the UPnP Forum.
Kou, Sho; Matsui, Takashi; Moonen, Jean; Rasheed, Yasser; Ritchie, John. "RenderingControl: 1 Service Template Version 1.01: For UPnP Version 1.0," Jun. 25, 2002. 1999-2002 Contributing Memebers of the UPnP Forum.
European Office Action for European Application No. 07734043.8, dated Jul. 8, 2011.

(Continued)

*Primary Examiner* — Ping Hsieh
(74) *Attorney, Agent, or Firm* — Winstead PC

(57) ABSTRACT

A system and method for enabling the integration of mobile telephone functions and the UPnP-enabled digital home. In an UPnP control point device, such as a UPnP mobile telephone, implementing the present invention, events such as the receipt of an incoming telephone call or message in the UPnP control point device application program interface can trigger the requesting of different UPnP actions in UPnP devices that relate to the event. In the UPnP environment, the UPnP control point device serves as a control point and transmits instructions to other devices. For example, the receipt of a phone call could cause the volume on a stereo or television to be lowered or muted, it could cause both live and taped television programs to pause, or it could perform other functions. A UPnP control point device of the present invention can also transmit instructions based upon requests received from remote locations.

32 Claims, 5 Drawing Sheets

(56) References Cited

OTHER PUBLICATIONS

English Translation of Office Action for Chinese Application No. 200780016386.5 dated Nov. 15, 2010.
Extended European Search Report for European Application No. 07734043.8 dated Dec. 3, 2010.
Motte, S., "Avoiding a Partially Connected Home: Building Further Upon the UPnP <TM> framework." Consumer Electronics, 2004.
Fout, T., "Universal Plug and Play in Windows." Aug. 8, 2001.
UPNP Forum: "UPnP Architecture:1" Jun. 25, 2002.
Chinese Office Action for Application No. 200780016368.5, dated May 25, 2011.
English translation of Chinese Office Action for Application No. 200780016368.5, dated May 25, 2011.
International Search report for PCT Application No. PCT/IB2007/000708, publication date: Jan. 23, 2008.

* cited by examiner

SYSTEM AND METHOD FOR MOBILE TELEPHONE AND UPNP CONTROL POINT INTEGRATION

FIELD OF THE INVENTION

The present invention relates generally to Universal Plug and Play (UPnP) devices. More particularly, the present invention relates to the integration of telephone services and UPnP control point functionality.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

UPnP is one of the technical cornerstones of the Digital Living Network Alliance (DLNA), a group which is working towards a wired and wireless interoperable network of Personal Computers (PC), Consumer Electronics (CE) and mobile devices in the home, enabling a seamless environment for sharing and growing new digital media and content services. UPnP technology defines an architecture for pervasive peer-to-peer network connectivity of intelligent appliances, wireless devices, and personal computers of all types. UPnP technology is designed to bring easy-to-use, flexible, standards-based connectivity to ad-hoc or unmanaged networks whether in the home, in a small business, public locations, or systems connected to the Internet. UPnP technology provides a distributed, open networking architecture that leverages TCP/IP and web technologies to enable seamless proximity networking, in addition to providing control and data transfer among networked devices.

The UPnP Device Architecture (UDA) is designed to support zero-con figuration, "invisible" networking and automatic discovery for a breadth of device categories from a wide range of vendors. With UDA, a device can dynamically join a network, obtain an IP address, convey its capabilities, and learn about the presence and capabilities of other devices.

There is currently a strong effort underway to more seamlessly integrate mobile telephone technology into the UPnP environment. These efforts involve attempts to integrate various telephone services, such as calls, messaging, etc., and UPnP control point functionality such that both can run in the same device. These efforts are necessary because, as UPnP "digital homes" become more commonplace, users will demand that their devices be capable of interacting with other devices to create a more "seamless" experience. In the current home environment, however, there is very little system integration among devices. Devices such as televisions, stereos, and DVD players operate independently from mobile telephones, even though the actions of one device can interfere with the enjoyment of another device. For example, a person may not be able to hear his telephone ringing if he is watching an action-filled movie with a surround-sound speaker system. This is because there is no system currently in place such that one device can "accommodate" another device in various use case scenarios. In addition to the above, there may be situations where a user wants to control his or her "home" devices remotely using another individual's UPnP environment as a relay or gateway. Current systems, however, are not sufficiently integrated to enable such a feature.

It would therefore be desirable to develop a system by which to better integrate various mobile telephone functions and the UPnP enabled digital home.

SUMMARY OF THE INVENTION

The present invention provides for an improved system and method for enabling the integration of mobile telephone functions and the UPnP-enabled digital home. In an UPnP environment implementing the present invention, events such as the receipt of an incoming telephone call or message in a user's mobile telephone application program interface (API) can trigger the requesting of different UPnP actions in UPnP devices that somehow relate to the event. In such an environment, the receipt of a phone call could cause the volume on a stereo or television to be lowered or muted, it could cause both live and taped television programs to pause, or it could perform other functions. Other events could cause different functions to occur.

The present invention provides a number of important advantages not currently available in conventional systems. The present invention greatly improves the usability of mobile devices as UPnP control points and as part of the home network. The present invention also improves the usability of UPnP devices and the improves interoperability of such devices. Still further, the incorporation of the present invention into devices such as mobile telephones adds value to such devices, particularly over audio/video (AV) control points which do not include such technology.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

This prevent invention comprises a system and method for enabling the integration of mobile telephone functions (such as phone calls) and the UPnP-enabled digital home or other environment. According to the present invention, various UPnP AV devices can be automatically controlled when a UPnP AV-capable device, acting as a AV control point, receives or initiates a telephone call or another designated action occurs.

Figure 1:
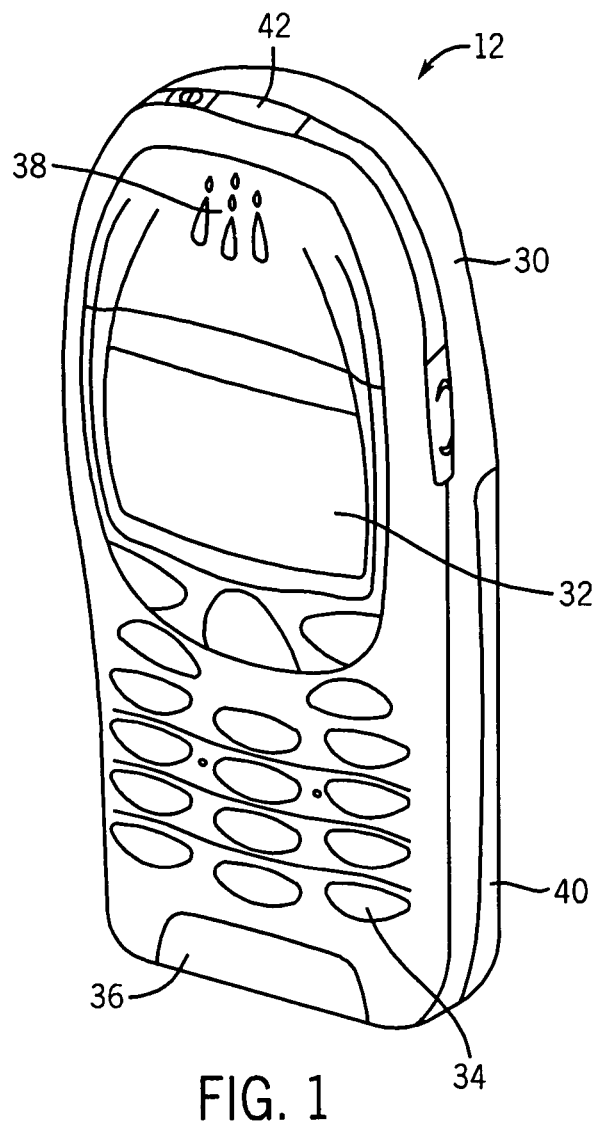
FIG. 1 is a perspective view of a UPnP mobile telephone that can be used in the implementation of the present invention.
Figure 2:
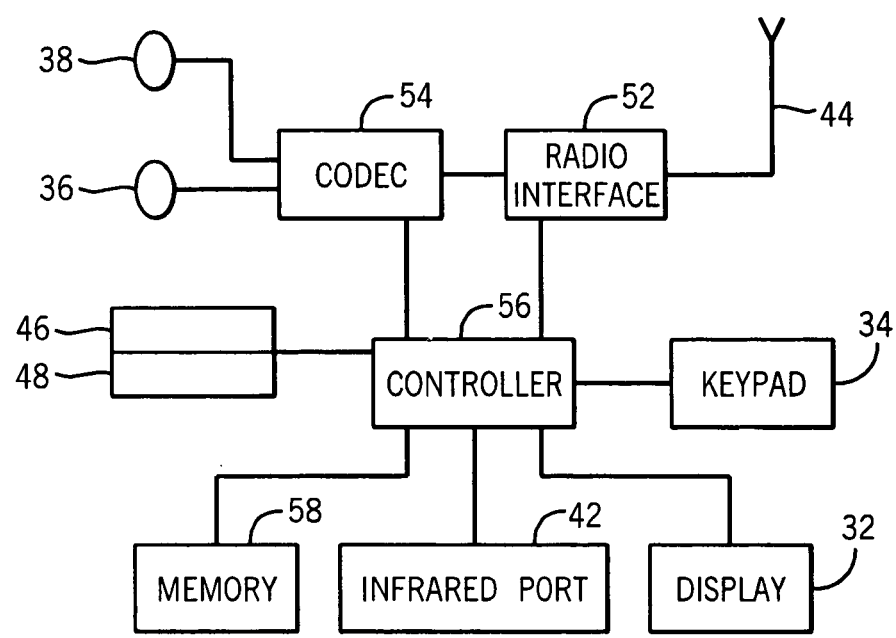
FIG. 2 is a schematic representation of the circuitry of the UPnP mobile telephone of FIG. 1

FIGS. 1 and 2 show one representative UPnP control point device, in the form of a UPnP mobile telephone 12, within which the present invention may be implemented. It should be understood, however, that the present invention is not intended to be limited to one particular type of UPnP mobile telephone 12 or UPnP control point device. The features and circuitry depicted in FIGS. 1 and 2 can be incorporated into a wide variety of other UPnP devices. The UPnP mobile telephone 12 of FIGS. 1 and 2 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones. The features and circuitry depicted in FIGS. 1 and 2 can be incorporated into a wide variety of other UPnP devices.

Figure 3:
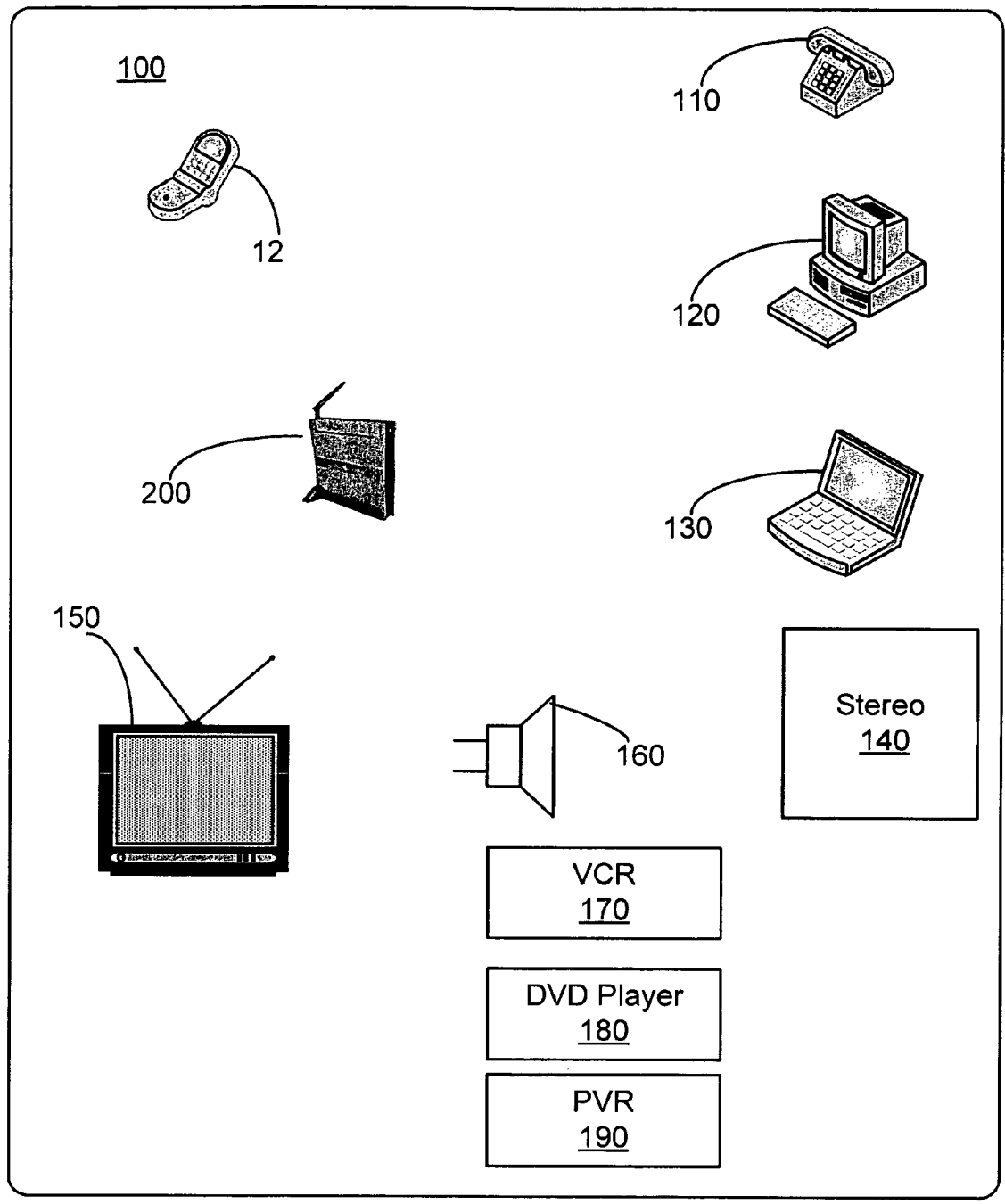
FIG. 3 is a representation of a local UPnP environment including a UPnP mobile telephone and a plurality of other UPnP devices.

FIG. 3 shows a representative UPnP environment 100 within which the present invention may be implemented. The UPnP environment 100 may comprise, for example, a person's living room, kitchen, home office, or other space. In addition to the UPnP mobile telephone 12, the UPnP environment 100 may include UPnP devices such as a land-line telephone 110, a desktop computer 120, a laptop computer 130, a stereo system 140, a television 150, a speaker system 160, a video cassette recorder (VCR) 170, a digital versatile disc (DVD) player 180, and a personal video recorder (PVR) 190. Other types of UPnP devices that can exist within the UPnP environment 100 include, for example, personal digital assistants (PDAs), a combination PDA and mobile telephone, and integrated messaging devices. A server 200 may be used, for example, to store items such as movies, music, television shows, games, and text-based files for use by UPnP devices within the UPnP environment 100.

According to one embodiment of the present invention, when a telephone call is received by the UPnP mobile telephone 12 or placed by the UPnP telephone 12, various actions can take place. In these situations, the UPnP mobile telephone 12 acts as a UPnP control point relative to other UPnP devices within the UPnP environment. In one example, when a telephone call is placed or received by the UPnP mobile telephone 12, the UPnP control point causes automatically mutes active UPnP AV renderers, such as the stereo system 140, the television 150, and/or the speaker system 160, using standard UPnP actions. In another example, when a call is placed or received, the UPnP control point pauses the playing of a DVD on the DVD 180 using standard UPnP actions. Such standard UPnP actions are defined, for example, in the AV transport service of the UPnP AV specifications which are known in the art. When the call ends, the UPnP AV control point automatically instructs the DVD player 180 to continue the playback. Similar activities can occur using the VCR 170.

In still another example, when a user receives and or places a call with the UPnP mobile telephone 12 while watching a live broadcast program, UPnP AV control point within the UPnP mobile telephone 12, automatically commands the PVR 190 to start time-shift recording the program. This function can also be performed by other devices, such as the television 150, the desktop computer 120, or the server 200 if any are properly equipped to do so. When the call ends, the UPnP AV control point automatically commands the PVR 190 (or the other properly equipped device(s)) to start playing the time-shift recorded program. Therefore, the user does not miss any of the programming as a result of the telephone call. A wide variety of other potential functions relating to the placing or receiving of telephone calls could also be implemented.

As discussed above, an example implementation of the present invention involves the API of a UPnP mobile telephone 12 discovering an incoming call, and then using the proper UPnP AV action to control a currently active playback session, for example by muting the speaker system 160 or pausing a DVD player 180, or to begin time-shift recording on a PVR 190. In one embodiment of the invention, these types of "automatic" actions are configurable by the user. For example and in this embodiment, the user must be capable of enabling and/or disabling the functionality at issue. Additionally, the user should be able to configure the UPnP action that is to be taken on the active UPnP device when an event is received from the API of the UPnP mobile telephone 12.

Another set of possible use cases involve the remote control of a user's UPnP devices when or she is not even at home yourself. In these scenarios and in a particular embodiment, it is assumed that the user possesses a dedicated UPnP telephone at home, or that one of the user's family members' UPnP telephones is at home. In such situations, a user may be able to perform functions such as turning on a home appliance (heating, ventilation, alarm system, etc.), program the PVR 190 to record a particular program, program the DVD player 180, program the VCR 170, or perform other functions by using the a telephone in the user's possession, in conjunction with the UPnP telephone located within the UPnP environment 100.

The implementation of the remote control scenario involves defining a special message type for UPnP control messages and also requires that this message type be properly handled in the Inbox of the UPnP telephone. When a special UPnP message (short message service (SMS) message, e-mail, etc.) is received, the message is handed over to the UPnP control point interface so that the control point can request the required actions from the UPnP devices in question. The remote control messages can be sent using an ordinary phone and its messaging applications. However, from a usability point of view and in one embodiment, it a special application can be used to provide a proper user interface (UI), with the details being hidden from the user. For remote control situations involving a PVR 190, ShowView codes, for example, can be used to minimize the information that the user has to input, thereby simplifying the programming.

Figure 4:
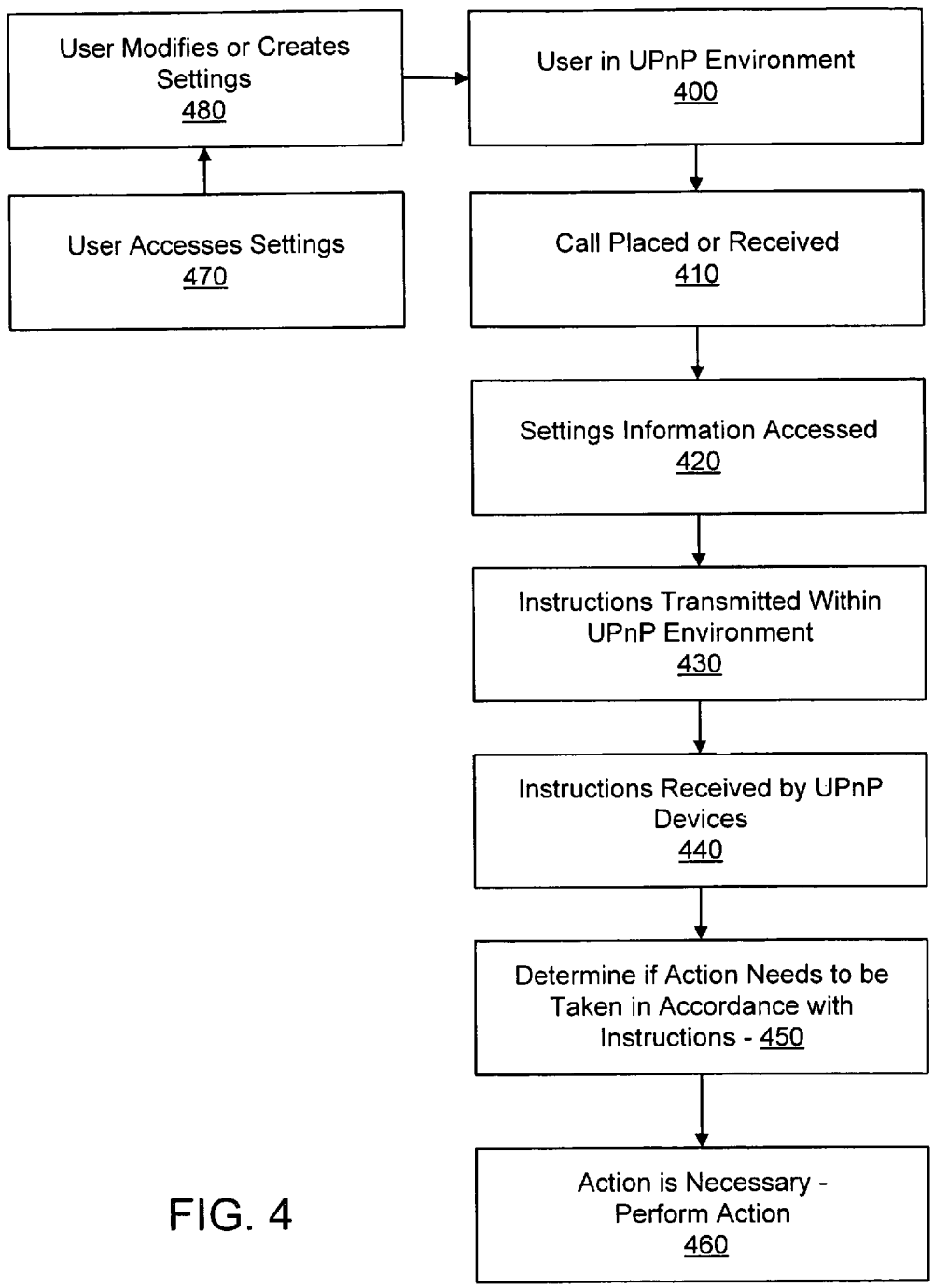
FIG. 4 is a flow chart showing the implementation of one embodiment of the present invention, where different functions are implemented upon the placement or receipt of a telephone call on a UPnP mobile telephone within a UPnP environment.

FIG. 4 is a flow chart showing the implementation of one embodiment of the invention. At 400 in FIG. 4, a user is in a UPnP environment 100 in which various pieces of UPnP equipment is being used. For example, the user could be watching a movie via a DVD player 180, watching a live television program, listening to music on a stereo system 140, etc. While the user is in the UPnP environment 100, he or she is also in possession of a UPnP mobile telephone 12. At 410, the UPnP mobile telephone 12 receives an incoming telephone call or begins to place an outgoing call. At 420, the UPnP mobile telephone 12 accesses a set of predefined settings or profile information in order to determine how to appropriately respond to the presence of this call. In other words, the UPnP mobile telephone determines if there are particular settings that indicate particular actions should occur in response to the call. If there are particular settings regarding a response that should be implemented, then at 430 the UPnP mobile telephone's UPnP control point interface transmits instructions within the UPnP environment 100 for certain UPnP devices to take certain actions in accordance with these settings. These instructions can be transmitted via broadcast messages (i.e., to all devices within broadcast range), multicast messages (to "registered" devices), or via direct transmission to the various UPnP devices within the UPnP network 100.

At 440, the transmitted instructions are received by the other UPnP devices within the UPnP environment 100. These instructions can comprise, for example, particular code that is incorporated to current and future UPnP specifications. At 450, each UPnP device determines whether the instructions are applicable to it and, if so, whether it needs to take any actions in order to comply with the instructions. For example, if the instructions only require the DVD player 180 to pause a live recording, then the speaker system 160 can ignore the instruction. At 460, if the instructions require a particular UPnP device to take a particular action, and if the UPnP device is operating such that it much change its behaviour to comply with the instruction, then it implements such a change in behaviour in accordance with the instruction. For example, in the case of the DVD player 180, if no DVD is being played, then no change in behaviour is necessary. On the other hand, if a DVD is being played when the instruction is received, then the DVD player 180 would respond to the instruction by pausing the DVD. Similar actions would take place for each UPnP device within the UPnP environment 100 where the instructions are applicable.

In one embodiment of the present invention, the UPnP mobile telephone 12 or other control point device includes a register of the devices that it is "controlling," as well as a list of what actions the control point device has asked those devices to perform. This can be accomplished, for example, by using standard UPnP eventing in order to obtain status change messages. In such an arrangement, UPnP audio/video transport (AVT) enables the UPnP control point device to follow the progress of various activities within the UPnP environment. For example, the control point device could follow the progress of a DVD being played on the DVD player 180 or a .mp3 file being played through the speaker system 160 via the desktop computer 120.

With the present invention, the types of UPnP devices which can be manipulated based upon instructions received from the UPnP mobile telephone 12 or other UPnP control point device include the various audio/video devices depicted in FIG. 3, as well as kitchen appliances, heating an cooling systems, alarm systems, and virtually any other device which can be configured for UPnP capabilities.

In addition to the transmission an implementation of appropriate instructions, and as discussed previously, it is also possible for a user to create or customize specific settings or profiles for use in the UPnP environment 100. At 470 in FIG. 4, a user accesses a "settings" section within the UPnP mobile telephone 12. In different embodiments, this may be able to occur both locally and remotely. At 480, the user can either modify an existing setting (for example, by also requiring that the VCR 170 pause playback when the UPnP mobile telephone 12 receives a call), or the user can create an entirely new set of settings (for example, creating a new set of rules that are to be implemented when a text message is receives.)

Figure 5:
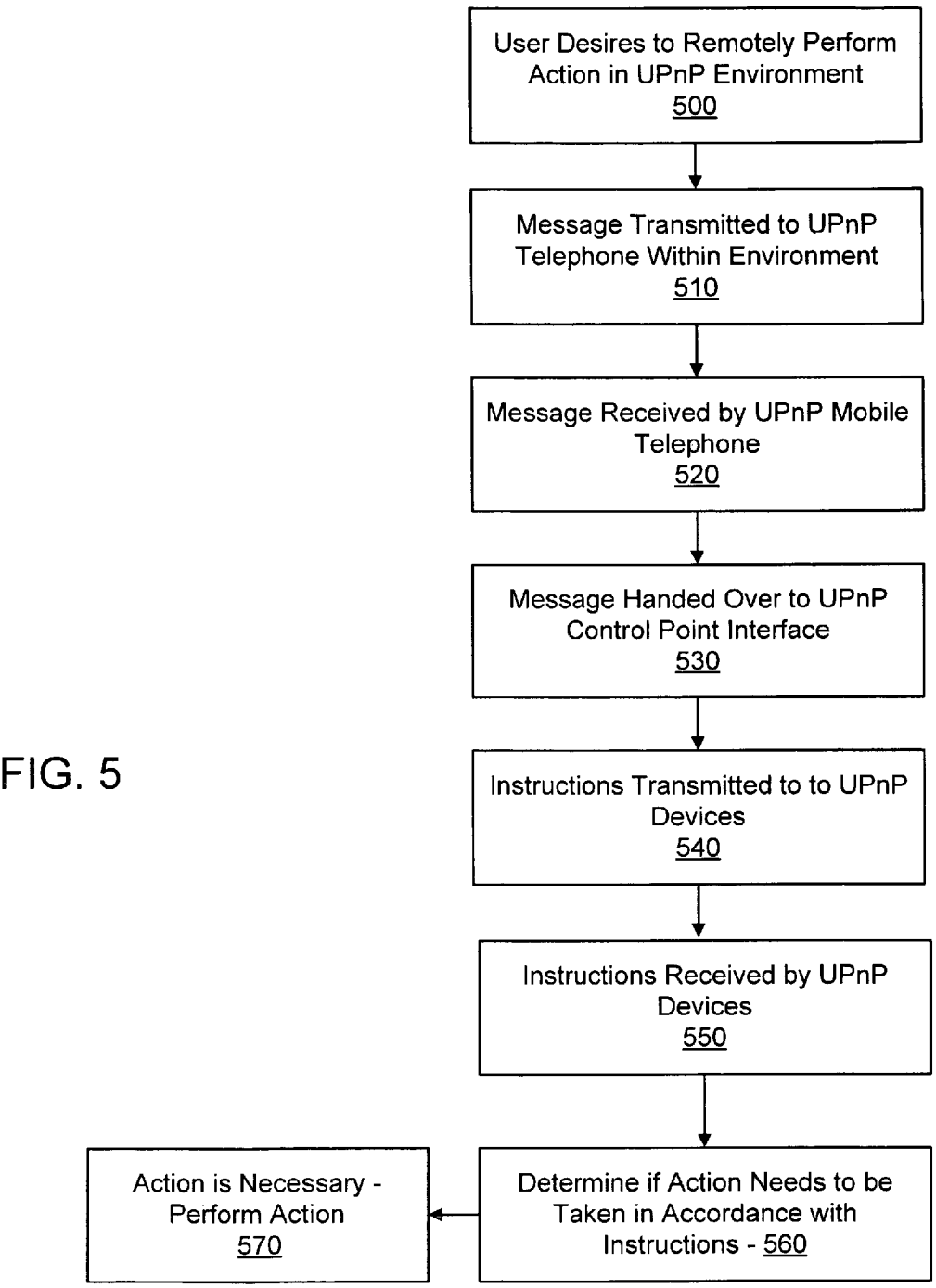
FIG. 5 is a flow chart showing the implementation of another embodiment of the present invention, where a user remotely instructions various UPnP devices to perform certain actions through the use of a UPnP telephone located within the UPnP environment at issue.

FIG. 5 is a flow chart showing the "remote use" scenario described previously. At 500 in FIG. 5, a user is not at home, instead being at work, travelling, etc. However, the user desires to perform some type of action relating to UPnP devices within his home. At 510, the user uses a device such as a mobile telephone, PDA, etc. to transmit a message to a UPnP mobile telephone 12 located within the UPnP environment 100 at issue. This message can be of a variety of types, including SMS messages, email, multimedia message service (MMS) messages, etc. At 520, the message is received by the desired UPnP mobile telephone 12. As discussed previously, the UPnP mobile telephone 12 can either be a "dedicated" item in the UPnP environment 100, or it could be a telephone in the possession of another person who happens to be located within the UPnP environment 100. At 530, the UPnP mobile telephone 12 hands the message over to its UPnP control point interface, which processes the message. At 540, the UPnP control point interface transmits instructions to the appropriate UPnP devices in accordance with the received message. This transmission can occur, for example, via multicast or broadcast messages, or device-specific transmissions can be used. At 550, the various UPnP devices within the UPnP environment 100 receive the instructions. At 560, each UPnP device determines whether the instructions are applicable to it and, if so, whether it needs to take any actions in order to comply with the instructions. At 570, if the instructions require a particular UPnP device to take a particular action, and if the UPnP device is operating such that it much change its behaviour to comply with the instruction, then it implements such a change in behaviour in accordance with the instruction.

It should be noted that, although many of the examples discussed herein specifically describe the use of a UPnP mobile telephone 12 as a control point, the present invention is also applicable to UPnP control point devices that include a wide variety of other capabilities. For example, devices that can serve as a UPnP control point according to the present invention may include functions such as multimedia messaging, music playing, video playing, game playing, and others. It should therefore be understood that UPnP control point devices of the present invention are not limited to mobile telephones.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, WLAN/VoIP, etc. A communication device may communicate using various media including, but not limited to, radio, infrared, laser, cable connection, and the like.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method in a UPnP control point device to effectuate actions in other UPnP devices within a UPnP environment, comprising:
    detecting specific activity, the specific activity comprising at least placing a telephone call;
    determining whether there is an action to be performed within the UPnP environment in response to the specific activity; and
    when there is an action to be performed within the UPnP environment in response to the specific activity, using a UPnP control point interface associated with the UPnP control point device to communicate one or more instructions to at least one of the other UPnP devices within the UPnP environment in accordance with the action to be performed, the at least one other UPnP device being included in a register of UPnP devices being controlled by the UPnP control point device; and
    adding an indication of the one or more instructions to a list of one or more actions communicated to at least one of the UPnP devices included in the register of UPnP devices being controlled by the UPnP control point device.

2. The method of claim 1, wherein the specific activity comprises at least one of placing a telephone call receiving an incoming telephone call at the UPnP control point device.

3. The method of claim 1, wherein determining whether there is an action to be performed within the UPnP environment in response to the specific activity includes determining whether there is at least one settings information indicating the action associated with the specific activity.

4. The method of claim 3, wherein the settings information is customizable by a user.

5. The method of claim 1, wherein the action to be performed comprises adjusting a volume level on at least one UPnP device.

6. The method of claim 1, wherein the action to be performed comprises adjusting playing of content on at least one UPnP device.

7. The method of claim 1, wherein the specific activity comprises receiving a message from an external device.

8. The method of claim 7, wherein the message is received via at least one of an electronic mail message, a short message service (SMS) message, and a multimedia message service (MMS) message.

9. The method of claim 7, wherein when the specific activity is a message received from the external device, determining whether there is an action to be performed within the UPnP environment in response to the specific activity comprises determining whether the message is a UPnP control message requesting the action to be performed.

10. The method of claim 1, wherein the at least one UPnP device within the UPnP environment comprises at least one audio/video device.

11. The method of claim 1, wherein the UPnP control point device comprises a UPnP mobile telephone.

12. A non-transitory computer-readable medium, including a computer program product, for using a UPnP control point device to effectuate actions in other UPnP devices within a UPnP environment, comprising computer code configured to:
    detect specific activity, the specific activity comprising at least placing a telephone call;
    determine whether there at least one action to be performed within the UPnP environment in response to the specific activity;
    when there is at least one action to be performed within the UPnP environment in response to the specific activity, use a UPnP control point interface associated with the UPnP control point device to communicate one or more instructions to at least one of the other UPnP devices within the UPnP environment in accordance with the at least one action to be performed, the at least one other UPnP device being included in a register of UPnP devices being controlled by the UPnP control point device; and
    add an indication of the one or more instructions to a list of one or more actions communicated to at least one of the UPnP devices included in the register of UPnP devices being controlled by the UPnP control point device.

13. The computer program product of claim 12, wherein the specific activity comprises at least one of placing a telephone call and receiving an incoming telephone call at the UPnP control point device.

14. The computer program product of claim 12, wherein determining whether there is at least one action to be performed within the UPnP environment in response to the specific activity includes determining whether there is at least one settings information indicating the at least one action associated with the specific activity.

15. The computer program product of claim 14, wherein the settings information is customizable by a user.

16. The computer program product of claim 12, wherein the at least one action to be performed comprises at least one of adjusting a volume level on at least one UPnP device and adjusting playing of content on at least one UPnP device.

17. The computer program product of claim 12, wherein the specific activity comprises receiving a message from an external device.

18. The computer program product of claim 17, when the specific activity is a message received from the external device, determining whether there is at least one action to be performed within the UPnP environment in response to the specific activity comprises determining whether the message is a UPnP control message requesting the at least one action to be performed.

19. A UPnP control point device, comprising:
    a processor; and
    a memory unit communicatively connected to the processor and including computer code configured to:
        detect specific activity, the specific activity comprising at least placing a telephone call;
        determine whether there is at least one action to be performed within the UPnP environment in response to the specific activity;
        when there is at least one action to be performed within the UPnP environment in response to the specific activity, use a UPnP control point interface associated with the UPnP control point device to communicate one or more instructions to at least one of the other UPnP devices within the UPnP environment in accordance with the at least one action to be performed, the at least one other UPnP device being included in a register of UPnP devices being controlled by the UPnP control point device; and add an indication of the one or more instructions to a list of one or more actions communicated to at least one of the UPnP devices included in the register of UPnP devices being controlled by the UPnP control point device.

20. The UPnP control point device of claim 19, wherein the specific activity comprises at least one of placing a telephone call receiving an incoming telephone call at the UPnP control point device.

21. The UPnP control point device of claim 19, wherein determining whether there is an at least one action to be performed within the UPnP environment in response to the specific activity includes determining whether there is at least one settings information indicating the at least one action associated with the specific activity.

22. The UPnP control point device of claim 21, wherein the settings information is customizable by a user.

23. The UPnP control point device of claim 19, wherein at least one action to be performed comprises at least one of adjusting a volume level on at least one UPnP device and adjusting playing of content on at least one UPnP device.

24. The UPnP control point device of claim 19, wherein the specific activity comprises receiving a message from an external device.

25. The UPnP control point device of claim 24, wherein when the specific activity is a message received from the external device, determining whether there is at least one action to be performed within the UPnP environment in response to the specific activity comprises determining whether the message is a UPnP control message requesting the at least one action to be performed.

26. The UPnP control point device of claim 19, wherein the UPnP control point device comprises a UPnP mobile telephone.

27. A system for automatically altering activities within a UPnP environment, comprising:
 a UPnP control point device configured to:
  detect specific activity, the specific activity comprising at least placing a telephone call,
  determine whether there is an action to be performed within the UPnP environment in response to the specific activity,
  when there is an action to be performed within the UPnP environment in response to the specific activity, use a UPnP control point interface associated with the UPnP control point device to communicate one or more instructions to at least on other UPnP device within the UPnP environment in accordance with the action to be performed, the at least one other UPnP device being included in a register of UPnP devices being controlled by the UPnP control point device;
  add an indication of the one or more instructions to a list of one or more actions communicated to at least one of the UPnP devices included in the register of UPnP devices being controlled by the UPnP control point device; and
 the at least one other UPnP device, each configured to:
  receive the one or more instructions from the UPnP control point device,
  determine whether the one or more instructions are applicable to the particular UPnP device and its then-current operation, and
  when the one or more instructions are applicable to the particular UPnP device and its then-current operation, adjusting the operation of the particular device in accordance with the one or more instructions.

28. The system of claim 27, wherein the specific activity comprises at least one of placing a telephone call and receiving an incoming telephone call at the UPnP control point device.

29. The system of claim 27, wherein determining whether there is an action to be performed within the UPnP environment in response to the specific activity includes determining whether there is at least one settings information indicating the action associated with the specific activity.

30. The system of claim 27, wherein the settings information is customizable by a user.

31. The system of claim 27, wherein the specific activity comprises receiving a message from an external device.

32. The system of claim 31, wherein when the specific activity is a message received from the external device, determining whether there is an action to be performed within the UPnP environment in response to the specific activity comprises determining whether the message is a UPnP control message requesting the action to be performed.

\* \* \* \* \*